(12) United States Patent
Uecker et al.

(10) Patent No.: US 9,636,766 B2
(45) Date of Patent: May 2, 2017

(54) COOPERATIVE WELDING SYSTEM

(71) Applicant: ILLINOIS TOOL WORKS INC., Glenview, IL (US)

(72) Inventors: James L. Uecker, Appleton, WI (US); Todd E. Holverson, Appleton, WI (US); Jeremy D. Overesch, Appleton, WI (US)

(73) Assignee: ILLINOIS TOOL WORKS INC., Glenview, IL (US)

( * ) Notice: Subject to any disclaimer, the term of this patent is extended or adjusted under 35 U.S.C. 154(b) by 440 days.

(21) Appl. No.: 14/223,693

(22) Filed: Mar. 24, 2014

(65) Prior Publication Data

US 2014/0203007 A1     Jul. 24, 2014

Related U.S. Application Data

(63) Continuation of application No. 10/907,916, filed on Apr. 20, 2005, now Pat. No. 8,680,432.

(51) Int. Cl.
| | |
|---|---|
| *B23K 9/10* | (2006.01) |
| *H05B 41/16* | (2006.01) |
| *B23K 9/173* | (2006.01) |
| *B23K 9/09* | (2006.01) |

(52) U.S. Cl.
CPC .............. *B23K 9/1735* (2013.01); *B23K 9/09* (2013.01); *B23K 9/1068* (2013.01)

(58) Field of Classification Search
CPC ....... B23K 9/09; B23K 9/1068; B23K 9/1735
USPC .............. 219/130.1, 130.51, 130.31, 130.32, 219/130.33, 130.5, 137 PS, 131, 132, 130, 219/6 A, 61, 124.22, 124.34, 125.11, 219/125.12; 315/277, 284, 320, 321, 322
See application file for complete search history.

(56) References Cited

U.S. PATENT DOCUMENTS

| | | | | |
|---|---|---|---|---|
| 3,299,249 A | * | 1/1967 | Sciaky | B23K 9/007 219/127 |
| 3,449,543 A | * | 6/1969 | Sciaky | B23K 9/007 219/130.51 |
| 3,497,667 A | | 2/1970 | Howlett | |

(Continued)

FOREIGN PATENT DOCUMENTS

| | | |
|---|---|---|
| EP | 0051424 | 5/1982 |
| JP | 6174375 | 6/1994 |

(Continued)

OTHER PUBLICATIONS

Dr. J. Platz, Double Wire Technology Increases Speed When MAG Welding, CL005 the Technical Issue, 4 pages, No. 68 E, Robotic Welding, Inc.

(Continued)

*Primary Examiner* — Dana Ross
*Assistant Examiner* — Ket D Dang
(74) *Attorney, Agent, or Firm* — Fletcher Yoder P.C.

(57) ABSTRACT

The present invention includes a welding system that has at least two metal inert gas (MIG) welders configured to perform a cooperative pulsed MIG welding process. The welding system also includes at least one communications link connecting the at least two MIG welders to deliver at least one of subordination commands and superiority commands to either of the at least two MIG welders to synchronize the cooperative pulsed MIG welding process.

18 Claims, 4 Drawing Sheets

(56) References Cited

U.S. PATENT DOCUMENTS

| | | | |
|---|---|---|---|
| 3,513,283 A | 5/1970 | Arnoldy | |
| 3,614,377 A * | 10/1971 | Stearns | B23K 9/1068 219/130.33 |
| 4,207,121 A | 6/1980 | Makabayashi | |
| 4,246,463 A | 1/1981 | Shutt | |
| 4,363,676 A | 12/1982 | Crockett | |
| 4,430,551 A | 2/1984 | Toth | |
| 4,628,182 A | 12/1986 | Hori | |
| 4,806,735 A | 2/1989 | Ditschun | |
| 5,004,884 A | 4/1991 | Sakaguchi | |
| 5,155,330 A | 10/1992 | Fratiello | |
| 5,171,958 A | 12/1992 | Yamaguchi | |
| 5,981,904 A | 11/1999 | Gordon | |
| 5,981,906 A | 11/1999 | Parker | |
| 5,991,169 A | 11/1999 | Kooken | |
| 6,055,161 A | 4/2000 | Church | |
| 6,150,631 A | 11/2000 | Sugitani | |
| 6,172,333 B1 | 1/2001 | Stava | |
| 6,207,929 B1 * | 3/2001 | Stava | B23K 9/092 219/130.51 |
| 6,291,798 B1 | 9/2001 | Stava | |
| 6,338,765 B1 | 1/2002 | Statnikov | |
| 6,429,405 B2 | 8/2002 | Belloni | |
| 6,472,634 B1 * | 10/2002 | Houston | B23K 9/0953 219/130.5 |
| 6,489,592 B2 | 12/2002 | Stava | |
| 6,534,746 B1 * | 3/2003 | Takatani | B23K 9/0213 219/130.51 |
| 6,660,965 B2 | 12/2003 | Simpson | |
| 6,660,966 B2 | 12/2003 | Houston | |
| 6,683,278 B2 | 1/2004 | Stava | |
| 6,683,279 B1 | 1/2004 | Moerke | |
| 6,697,701 B2 | 2/2004 | Hillen | |
| 6,847,008 B2 | 1/2005 | Myers | |
| 6,855,912 B2 | 2/2005 | Houston | |
| 2001/0000899 A1 | 5/2001 | Stava | |
| 2002/0125235 A1 * | 9/2002 | Stava | B23K 9/092 219/130.33 |
| 2002/0168937 A1 | 11/2002 | Clark | |
| 2002/0190045 A1 | 12/2002 | Stava | |
| 2003/0033052 A1 * | 2/2003 | Hillen | G05B 19/042 700/212 |
| 2004/0026392 A1 | 2/2004 | Feichtinger | |
| 2004/0035839 A1 | 2/2004 | Stava | |
| 2004/0050833 A1 | 3/2004 | Stava | |
| 2004/0069759 A1 | 4/2004 | Davidson | |
| 2004/0140302 A1 * | 7/2004 | Myers | B23K 9/0253 219/130.51 |

FOREIGN PATENT DOCUMENTS

| | | |
|---|---|---|
| JP | 10323758 | 12/1998 |
| JP | 2000000667 | 1/2000 |
| JP | 2000271747 | 10/2000 |
| JP | 2001113373 | 4/2001 |
| JP | 2003053532 | 2/2003 |
| JP | 2003053535 | 2/2003 |
| JP | 2003053545 | 2/2003 |

OTHER PUBLICATIONS

Romat Weldina Robots. MIG/MAG Hiah Speed Weldina with Tandem Process. Tandem, Schweisstechnik, 3 pages.

S. Blackman. High Productivity Dual-Tandem GMAW Pipeline Welding System "CAPS"—Cranfield Automated Pipe-Welding System, pp. 1-16, Welding Engineering Research Centre, Cranfield University, Cranfield, Bedford, England.

Tandem MIG Process. High Speed Tandem MIG Welding, 6 pages. E10.604/99, Lincoln Electric, Cleveland, Ohio.

Process Waveform Control Technology, Tandem MIG, Nov. 2003, pp. 1-4, NX-2.40, Lincoln Electric.

Tandem MIG Torch, IM666-A, Operator's Manual, G3494-2, 3, 4, 5, 6, G3494-2A, 3A, 4A, 5A, 6A, Jan. 2005, 25 pages, Lincoln Global Inc., Cleveland, Ohio.

K. Michie et al., Twin-Wire GMAW: Process Characteristics and Applications, Welding Journal, May 1999, pp. 31-34.

Prof. Dr.-Ing. Ulrich Dilthey et al.. Increased Productivity by Higher Deposition Rate and Higher Welding Speed Using Two-Wire GMA Welding Processes, IWC, '99, pp. 2, 7, 8, ISF-Welding Institute, Auchen University, Germany.

S.A. Blackman et al, High Speed Tandem GMAW, pp. 1-9 (10).

* cited by examiner

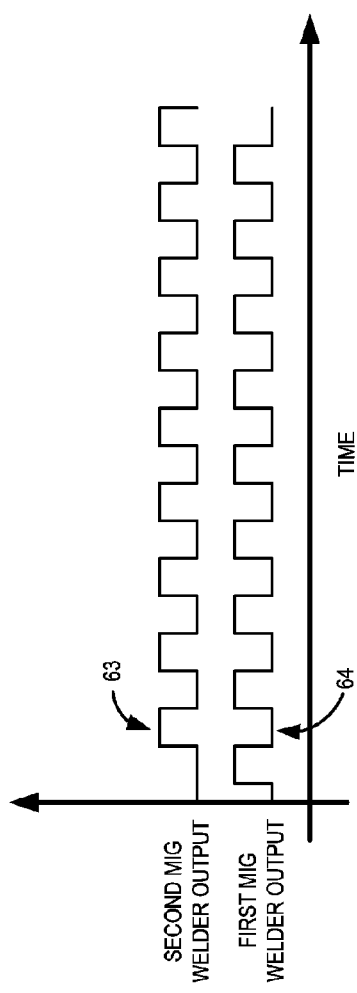
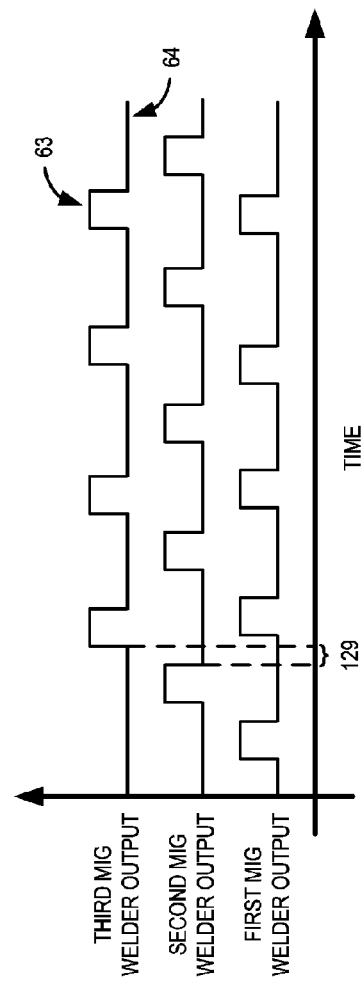

COOPERATIVE WELDING SYSTEM

CROSS-REFERENCE TO RELATED APPLICATION

This application is a continuation of U.S. patent application Ser. No. 10/907,916, filed Apr. 20, 2005, entitled "Cooperative Welding System" in the name of James L. Uecker et al., which is incorporated herein by reference.

BACKGROUND OF THE INVENTION

The present invention relates generally to welding and, more particularly, to a method and system of dynamically controlling operation of a plurality of metal inert gas (MIG) welders to perform a cooperative welding process. By dynamically controlling operation of the plurality of MIG welders between subordinate and superior operational states, a cooperative welding process is achieved across variations in welding parameters.

MIG welding, also known as Gas Metal Arc Welding (GMAW), is a process where an electrical arc is created between a continuous, consumable wire electrode and a workpiece. A wire feeder is typically used to deliver the consumable wire to the weld. The wire feeder is generally connected to a power source that powers the driver motor(s) of the wire feeder as well as delivers welding power to generate a welding arc. As such, the consumable wire functions as the electrode in the weld circuit as well as the source of filler metal.

Some applications require that particularly thick workpieces or heavy welds be utilized. Accordingly, some MIG welding systems have been designed to provide increased weld deposition at reduced per welder currents in order to produce a more uniform distribution of heat in the weld pool. This often results in an improved weld having fewer defects when welding heavy materials. In particular, welding systems have been developed that include two MIG welders that operate together to carry out a "tandem" or "twin" welding process. That is, two MIG welders are used to conjunctively weld a single workpiece.

To create these "dual", "tandem", or "twin" systems, two separate MIG welders are combined to create an overall system having two power sources, two wire feeders, and two welding torches. To perform the desired welding process, both welding torches are positioned near the workpiece such that two independent welds are performed on the workpiece. However, if the welding torches of both MIG welders are positioned in close proximity, the arcs from both torches may undesirably interact. Such interaction is undesirable because it negatively affects the consistency and control of the welding process. For example, if the two welding arcs have different polarities, the magnetic fields generated by the arcs push the arcs away from one another. On the other hand, if the arcs have the same polarity, the magnetic fields induced by the arcs oppose one another and push the arcs inward.

As such, traditional dual welding systems include sufficient separation of the welding torches so as to substantially reduce the potential of arc interaction. However, by separating the welding torches, the weld pool is given an opportunity to at least partially solidify after the first welding torch passes and before the second welding torch arrives. In this case, rather than compounding the welding procedure to achieve the desired increased penetration and deposition at the weld, the second welding torch "re-welds" the weld formed by the first welding torch. That is, the first welding torch performs the weld, the weld then solidifies following the departure of the first welding torch, and then the second welding torch arrives at the weld to perform a "re-weld."

To overcome these problems, some welding systems have been designed that operate according to a "switched" MIG welding procedure. In particular, in order to make operating two-arcs in close proximity feasible, some systems have been designed to switch or alternate the application of the first arc and the second arc to the weld. To achieve the switching of each arc current, various systems have been utilized to limited success.

One switching MIG welding system dedicates one power source to simultaneously supplying a low current to both welding torches while the other power source switches a supply of high current between the two welding torches. As such, these switching MIG welding systems employ a commutator that switches the high current supply from one power source between the two electrodes while the second power source supplies a low current supply to sustain the arc as the high current is switched.

However, these systems must include a specialized power source that includes the switching circuitry necessary to switch the high current supply between the welding torches. As such, the output of the welders may not be independently controlled. Therefore, the welding parameters, such as the wire feed speeds, phase frequencies, wire diameters, and wire types must be the same for both welding outputs, which hinders flexibility in tailoring the welding procedure to a particular application. That is, it may be desirable to augment several variables of a MIG welding process to meet the needs of the specific welding procedure to be performed. For example, MIG welding may be used to weld most commercial metals and alloys including steel, aluminum, and stainless steel. As such, it may be desirable to vary the wire feed speed and the deposition rates between the two MIG welders. However, such variances are not generally possible in these switching MIG welding systems. Furthermore, since both power sources must be adapted to be dedicated to the specialized dual welding procedure, these switching systems do not include two independent MIG welders that may readily operate independent of the dual arrangement. Additionally, these switching MIG welding systems cannot typically be expanded to include more than two welders.

Another switching MIG welding system utilizes two welders arranged in a master and slave configuration. In this case, a master power source is designated to control the operation of the other power source, which is designated as a slave power source. With such an arrangement, the master power source tells the slave power source when to apply high currents to the weld. As such, the master power source, directly or indirectly, controls the timing of the application of high current supplied to both welding torches. In particular, the master power source includes an oscillator whose output is directly supplied to a pulse generator connected to create a high current pulse at the master welding torch. In addition to its direct connection to the pulse generator of the master power source, the output of the oscillator is sent from the master power source to the slave power source. At the slave power source, the signal from the oscillator is subjected to a delay circuit before it is delivered to a pulse generator of the slave power source. Accordingly, the slave power source is not caused to deliver a high current to the slave welding torch until the expiration of a predetermined or user-selected delay. In this regard, the high current pulses supplied to the master welding torch and the slave welding torch are staggered so as to not interact.

While the master/slave MIG welding system achieves a staggered output to reduce arc interaction, by employing a static delay, the master/slave MIG welding system cannot adapt to varying welding parameters between the master welder and the slave welder. That is, welding parameters such as the wire feed speed, phase frequency, wire diameter, and wire type must be consistent between the master and the slave welder. Accordingly, master/slave systems lack the flexibility necessary to tailor the dual welder procedure to a particular application. Furthermore, such MIG welding systems are generally not expandable to include more than a single master welder and a single slave welder.

Therefore, these conventional "tandem" systems are limited to only two welders. That is, both the switching power source dual welder configurations and the master/slave configurations are not designed to incorporate more than two welders. As such, these systems are often referred to as "tandem" welding systems.

It would therefore be desirable to have a system and method capable of performing a multi-welder MIG welding process based on a dynamically controlled pulse welding procedure to accommodate varying welding parameters between the multiple MIG welders. Furthermore, it would be desirable that the multi-welder MIG welding system that can include more than two independent MIG welders. Additionally, it would be desirable to have a welder capable of operating as a stand-alone welder or as part of a multi-welder system.

BRIEF DESCRIPTION OF THE INVENTION

The present invention is directed to a welding system that overcomes the aforementioned drawbacks. Specifically, the present invention includes a welding system configured to perform a cooperative pulsed MIG welding process. The welding system utilizes dynamically generated subordination and/or superiority commands to control the MIG welders to perform the cooperative pulsed MIG welding process with differing wire feed speeds, phase frequencies, wire diameters, or wire types. Furthermore, the welding system is adaptable to include more than two MIG welders. The present invention also includes a welder operable in a stand-alone mode as well as a component of a multi-welder arrangement.

Therefore, in accordance with one aspect of the present invention, a welding system is disclosed that includes at least two metal inert gas (MIG) welders configured to perform a cooperative pulsed MIG welding process. The welding system also includes at least one communications link connecting the at least two MIG welders to deliver at least one of subordination commands and superiority commands to either of the at least two MIG welders to synchronize the cooperative pulsed MIG welding process.

In accordance with another aspect of the present invention, a MIG welder is disclosed that includes a power source configured to provide power according to a pulsed MIG welding process. The MIG welding system also includes a controller configured to control operation of an another MIG welder during a first phase of the pulsed MIG welding process and to be controlled by the another MIG welder during a second phase of the pulsed MIG welding process.

According to another aspect of the present invention, a welding system is disclosed that includes an array of MIG welding power sources configured to operate according to a reciprocal pulsed MIG welding process. Each MIG welding power sources is configured to communicate a standby command to an adjacent welding power source when each welding power source is entering a peak phase of the reciprocal pulsed MIG welding process to preclude any adjacent welding power source from concurrently entering the peak phase of the reciprocal pulsed MIG welding process.

Various other features and advantages of the present invention will be made apparent from the following detailed description and the drawings.

BRIEF DESCRIPTION OF THE DRAWINGS

The drawings illustrate one preferred embodiment presently contemplated for carrying out the invention.

In the drawings:

FIG. 3 is a graph illustrating welding phase changes over time of a cooperative welding system according to one embodiment of the present invention.

FIG. 5 is a graph illustrating welding phase changes over time of a cooperative welding system according to another embodiment of the present invention.

DETAILED DESCRIPTION OF THE PREFERRED EMBODIMENT

Figure 1:
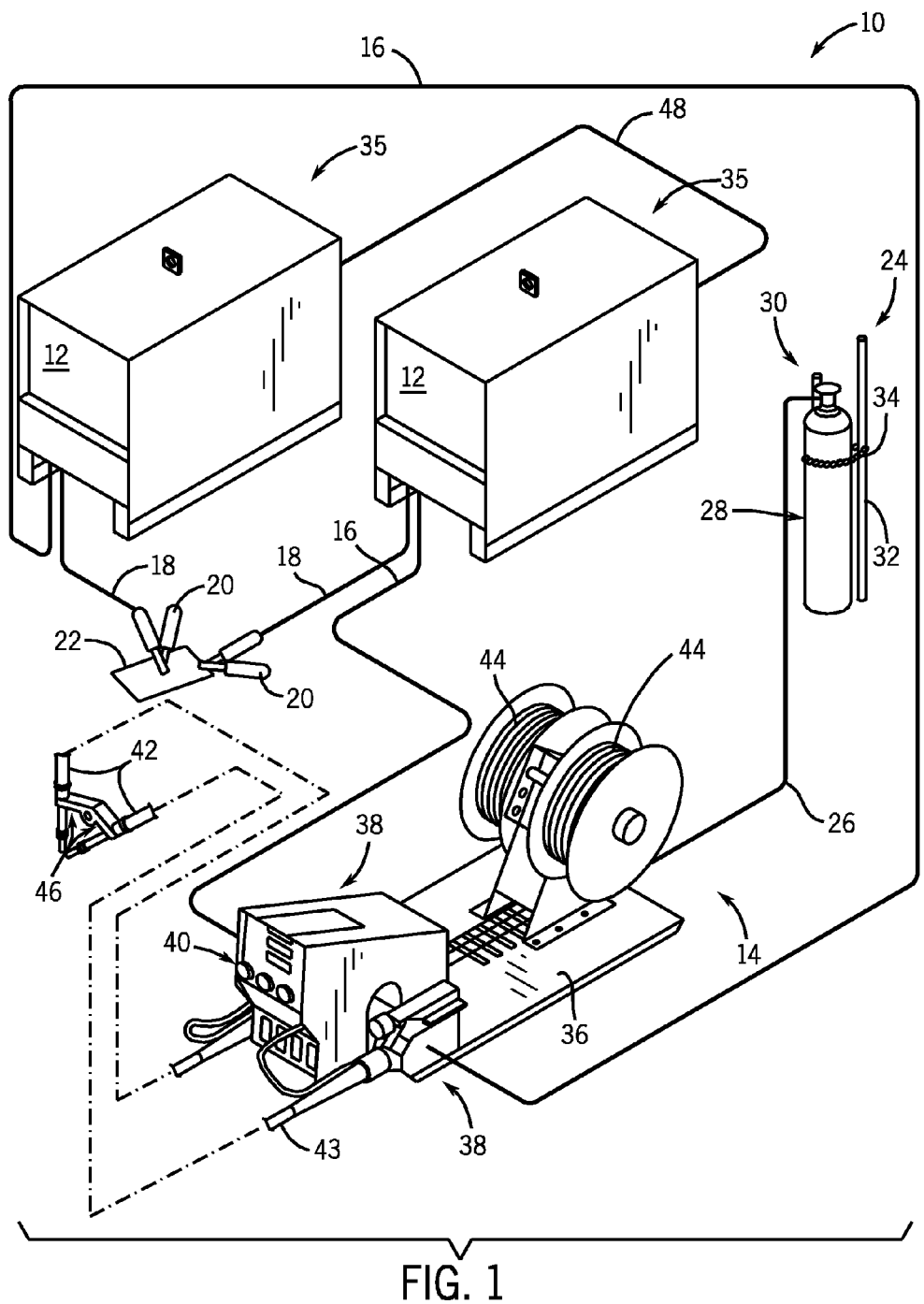
FIG. 1 is a perspective view of a cooperative welding system.

Referring now to FIG. 1, an exemplary cooperative welding system 10 is shown having a plurality of power sources 12 that deliver power to a wire feeder system 14. Specifically, the wire feeder system 14 is electrically connected to the power sources 12 via weld cables 16. The weld cables 16 may carry either a positive charge or a negative charge depending upon the particular cooperative welding process. Additionally, workpiece or ground cables 18 extend from the power sources 12 to clamping members 20, which are configured to engage a workpiece 22. A gas supply 24 is connected via gas hoses 26 to the wire feeder system 14 to supply gas for the desired MIG welding process. While a single gas cylinder 28 is shown, it is contemplated that multiple gas cylinders 28 may be utilized. Additionally, it is contemplated that the welding processes performed by the cooperative welding system 10 may not require a supply of gas. Accordingly, when such a welding processes is performed, it is contemplated that the gas cylinder 28 may be removed or that the cooperative welding system 10 not include a gas supply. However, if included, the gas cylinder 28 includes a regulator and flow meter system 30 and, in the embodiment illustrated in FIG. 1, is securely positioned against a structure 32 via a chain 34. Therefore, as will be described, the welding system 10 includes two separate MIG welders 35 that are configured to perform a cooperative pulsed MIG welding process.

As shown, the wire feeder system 14 includes a base plate 36 which is configured to support multiple wire drive systems 38 that are configured to deliver consumable wire based on inputs entered at a user interface 40. The user interface 40 is configured to receive multiple operational parameters to allow independent operation of the multiple wire drive systems 38. That is, it is contemplated that the user interface 40 is configured to allow selection of differing operational parameters for each wire drive system 38 such as differing wire feed speeds, phase frequencies, wire diameters, or wire types without altering or negatively affecting the cooperative pulsed MIG welding process. While a single user interface is shown, it is contemplated that a separate user interfaces may be associated with each wire drive system. Therefore, rather than a wire feeder system 14 that includes multiple wire drive systems 38, it is contemplated that autonomous wire feeders may be utilized, whereby each wire feeder is connected to a respective power source 12. Similarly, it is contemplated that the user interface 40 may be integrated with the power source 12.

Two welding torches 42 are connected by the power/wire feed lines 43 to the wire drive systems 38. Specifically, each welding torch 42 is connected to a respective wire drive system 38 to allow independent wire and power deliver to each welding torch 42. Therefore, the welding torches 42 are supplied with welding wire from respective wire supplies or spools 44 and power from respective power sources 12. While only two welding torches 42 and corresponding wire drive systems 38 and power sources 12 are shown, as will be described, the welding system 10 is expandable and may include multiple welding torches 42 that are supplied with welding wire 44 by a respective wire drive system and power by a respective power source. Additionally, it is contemplated that a common torch body may be utilized that is configured to receive welding wire from both wire spools 44 and power from both power sources 12. That is, rather than two independent welding torches 42, it is contemplated that a single welding torch having two or more tips may be utilized with the cooperative welding system 10.

The welding torches 42 are secured and positioned together by a support member 46 configured to arrange the welding torches 42 in close proximity in order to perform a cooperative pulsed MIG welding process upon the workpiece 22. That is, as will be described in detail with respect to FIG. 2, a communications link 48 is included to facilitate the communication of dynamically generated subordination commands between the separate MIG welders 35 to synchronize the pulses from each welder 35 and perform a cooperative pulsed MIG process. Furthermore, as will be described, operational parameters may be defined independently for each welder.

Figure 2:
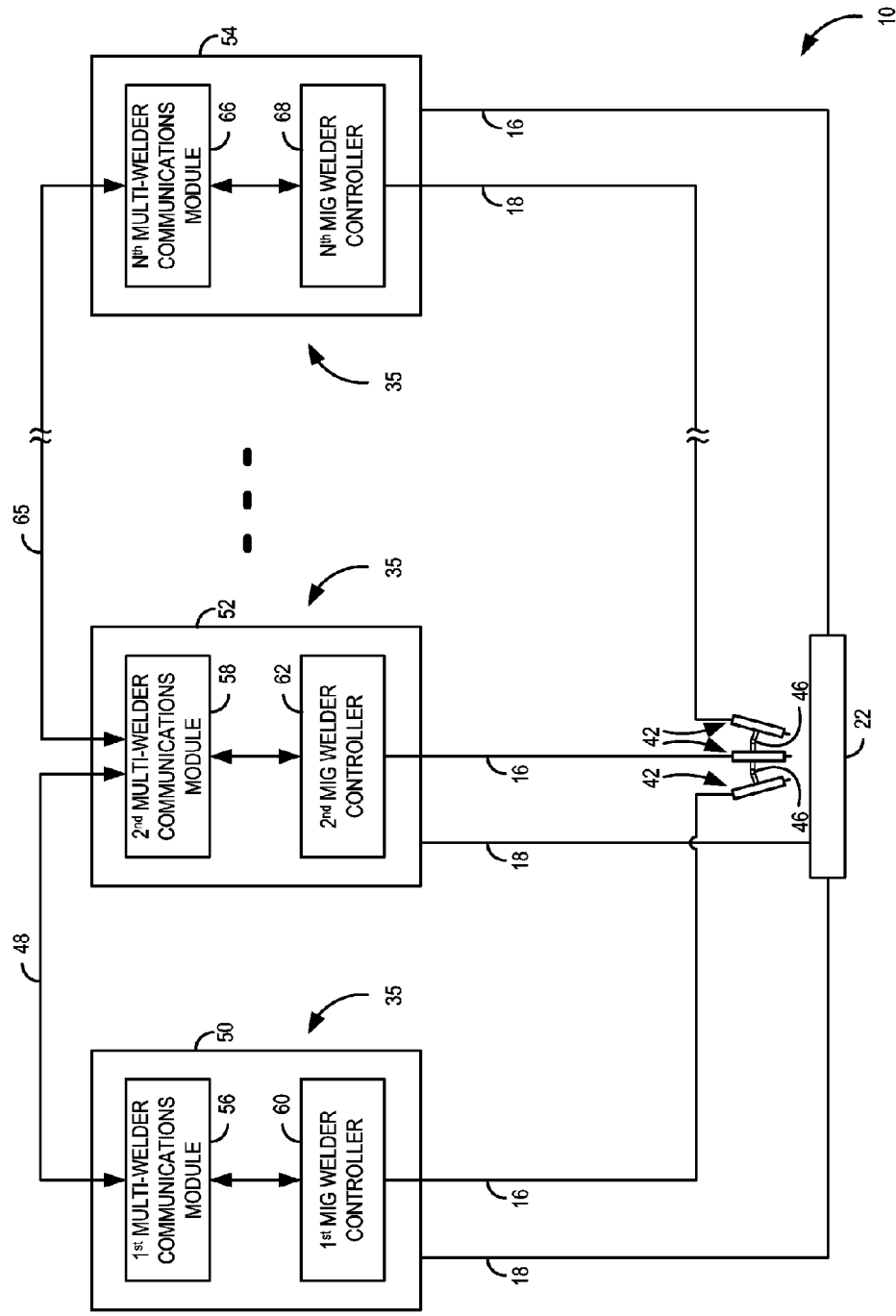
FIG. 2 is a block diagram of a cooperative welding system according to one embodiment of the present invention.

Referring now to FIG. 2, a cooperative welding system 10 is shown in block diagram format. As will be described, the cooperative welding system 10 is configured to communicate with other welders in the cooperative welding system 10 via an ad-hoc or peer-to-peer network. As stated, the cooperative welding system 10 includes multiple individual MIG welders 35. In particular, the multiple individual MIG welders 35 include a first MIG welder 50 and a second MIG welder 52. As previously described, the cooperative welding system 10 is configured to be dynamically expandable to include additional welders such as an $N^{th}$ MIG welder 54. That is, while the system of FIG. 1 was described with respect to two individual MIG welding systems 35, the cooperative welding system 10 is dynamically expandable to form an array of numerous individual MIG welders 50-54.

The first and second MIG welders 50, 52 are connected via the communications link 48. According to one embodiment, a single communications link 48 is utilized to provide a bidirectional communications path between the first and second MIG welders 50, 52. However, it is contemplated that two or more unidirectional communications links may also be utilized to facilitate communications between the first and second MIG welders 50, 52. Furthermore, as will be described, it is contemplated that a communications bus may be utilized whereby a given welder connected to the communications bus can communicate with all other welders connected to the communications bus substantially simultaneously.

Should the cooperative welding system 10 only include two MIG welders 50, 52, the communications link 48 provides a communications path between a first multi-welder communications module 56 disposed within the first MIG welder 50 and a second multi-welder communications module 58 disposed within the second MIG welder 52. The first and second multi-welder communications modules 56, 58 are configured to relay subordination commands generated by a first welder controller 60 and a second welder controller 62. That is, as will be described, the first and second multi-welder communications modules 56, 58 are configured to transmit and receive subordination commands over the communications link 48, which are then used by the first and second welder controllers 60, 62 to synchronize a cooperative pulsed MIG welding process.

For purposes of illustration, an exemplary cooperative pulsed MIG process is defined to have two phases: a peak phase and a background phase. Referring now to FIG. 3, a graph illustrating the output of first and second MIG welders configured to operate according to a pulsed MIG welding process is shown. The output of the MIG welders alternates between the peak phase and background phase that, in turn, creates a pulsed spray transfer of consumable welding wire across the arc gap to the workpiece. Specifically, each MIG welder switches between a high or "peak" current output 63 and a low or "background" current output 64. During the application of the peak current 63, which defines the peak phase, the increased current pinches off a spray transfer droplet and propels the drop toward the weld. During the application of the background current 64, which defines the background phase, the current is decreased to a lower level that is intended to maintain the welding arc, but which is too low for metal transfer to occur. Therefore, to perform the cooperative pulsed MIG welding process, outputs of the first and second MIG welder are coordinated such that the first and second MIG welder outputs are not concurrently at a peak 63.

While the pulsed MIG welding process ideally alternates between the peak phase and the background phase, it is possible to have arc outages or short circuits. In this case, the welding arc has not been sustained and must be restarted. As such, it is contemplated that the cooperative pulsed MIG welding process may be defined to have additional phases, such as a short circuit phase, restrike delay phase, restrike phase, and restrike return phase.

Additionally, it is contemplated that the cooperative MIG welding system may include welders that do not operate according to a pulsed operation. That is, it is contemplated that, for example, one of the welders in the cooperative welding system may operate according to traditional MIG welding processes other than pulsed. For example, one of the welders in the cooperative welding system may be configured to operate according to a short circuit process while the other welders operate according to a pulsed process. In this case, though one of the welders is not performing a pulsed welding process, the overall cooperative welding system still operates according to a cooperative pulsed MIG welding process.

Similarly, it is contemplated that the cooperative pulsed MIG welding process may be performed using pulsed welding processes that include more than two phases. That is, for exemplary purposes, FIG. 3 shows a two phase pulsed MIG process having a peak phase 63 and a background phase 64, it is contemplated that one or more of the welders in the cooperative welding system may operate according to a pulsed MIG process having more than two phases.

For example, a given welder may operate according an alternating current (AC) MIG or Short-by-Short process. Specifically, AC Pulse MIG processes are similar to direct current (DC) Pulse MIG processes except that the process includes phases for polarity changes and phases for transitions between the polarity changes. Short-by-Short is a process that is similar to a short circuit MIG process except that it is highly controlled and breaks the short circuit and arc times into multiple phases. In both cases, by controlling the multiple phases, ball formation, ball transfer, and heat input can be accurately controlled and regulated. Furthermore, each process can be adjusted to fit the particular needs of a specific application. In this case, as will be described, more than one phase may require a subordination command to be communicated prior to entering the phase.

As described above, when a subsequent phase must be delayed in order to wait for an adjacent welder to remove a subordination command, the delay extends the current phase. As such, the background phase serves as the "delay phase." However, when a welder is operating according to a process having more than two phases, it may not be desirable to sustain the current phase. Accordingly, an alternative phase may be provided to serve as the delay phase. In this case, the delay phase need only be known to the particular welder operating according to the process having more than two phases. For example, other welders may be operating according to a process having only two phases and, thus, not know that a welder operating according to a process having more than two phases transitioned to the delay phase. That is, transitions to additional phases that do not require adjacent welders to be designated as subordinates, do not need to be communicated among the welders.

The following tables illustrate one example of a cooperative welding system having three welders synchronized to perform a cooperative pulsed MIG welding process. According to this example, the cooperative welding system includes Welder A operating according to a two phase pulsed MIG process, Welder B operating according to an AC MIG process, and Welder C operating according to a short-by-short MIG process. In particular, the tables list the phases of each process, the phases that require a subordination command to be communicated prior to entry, and the delay phases.

Welder A (Two Phase MIG)

| Phases | Communication Required | Delay Phase |
|---|---|---|
| 1 Peak | Subordination | Background |
| 2 Background | None | Background |

Welder B (AC MIG)

| Phases | Communication Required | Delay Phase |
|---|---|---|
| 1 Positive Peak | Subordination | Positive Background |
| 2 Positive Background | None | Positive Background |
| 3 Negative Peak | Subordination | Negative Background |
| 4 Negative Background | None | Negative Background |

Welder C (Short-by-Short MIG)

| Phases | Communication Required | Delay Phase |
|---|---|---|
| 1 Phase 1 | None | Phase 1 |
| 2 Phase 2 | None | Phase 2 |
| 3 Phase 3 | Subordination | Special Delay Phase |
| 4 Phase 4 | None | Phase 4 |
| 5 Phase 5 | Subordination | Special Delay Phase |
| 6 Special Delay Phase | None | Special Delay Phase |

While in the above-listed tables it is indicated that numerous phases have no communication required, it is contemplated that the cooperative welding system may operate according to a shared hierarchy communications protocol. In this case, each welder communicates transitions to and from each phase, even if a communication is not required. As such, communications regarding some phases may be regarded by other welders as a "don't care" status and can occur at anytime. However, as indicated above, many phases require a subordination command to be communicated prior to a transition. Communications regarding these phases are regarded by adjacent welders as an "attention" status and, as will be described, can only occur when another adjacent welder has not established superiority. That is, priority for communication of subordination commands and entry into a corresponding phase is established on a first occurrence basis.

The welders communicate subordination commands in a peer-to-peer fashion such that when two or more adjacent welders are both ready to enter a phase that requires the welder to designate adjacent welders as subordinate, priority is established by the welder that first communicates a subordination command. In the event that the adjacent welders concurrently send and receive a subordination command, the adjacent welders would enter the delay phase with each having a random timeout. Accordingly, when performing a cooperative pulsed MIG welding process that includes two phases, a welder that is designated as subordinate remains in the previous phase, typically a background phase. On the other hand, when performing a cooperative pulsed MIG welding process that includes more than two phases, a welder that is designated as subordinate may be permitted to move to subsequent phases, as long as the subsequent phases would not require prior establishment of superiority.

Additionally, within the shared hierarchy communications protocol, it is contemplated that the phases may be prioritized. In this case, for example, a phase of higher priority may be permitted to interrupt another phase of lower priority. That is, if a welder has established superiority, its respective process could be interrupted. In particular, a given welder may be caused to enter the delay phase by another welder that is about to enter a phase having a higher priority than that of the given welder. Furthermore, if two phases have the same priority level, then superiority is established on a first occurrence basis.

The following tables illustrate one example of a cooperative welding system having three welders synchronized to perform a cooperative pulsed MIG welding process by communicating according to a shared hierarchy communications protocol with prioritized phases. According to this example, the cooperative welding system includes Welder A operating according to a two phase pulsed MIG process, Welder B operating according to an AC MIG process, and Welder C operating according to a short-by-short MIG process.

Welder A (Two Phase MIG)

| Phases | Priority Level | Delay Phase |
| --- | --- | --- |
| 1 Peak | 1 | Background |
| 2 Background | None | Background |

Welder B (AC MIG)

| Phases | Priority Level | Delay Phase |
| --- | --- | --- |
| 1 Positive Peak | 1 | Positive Background |
| 2 Positive Background | None | Positive Background |
| 3 Negative Peak | 2 | Negative Background |
| 4 Negative Background | None | Negative Background |

Welder C (Short-by-Short MIG)

| Phases | Priority Level | Delay Phase |
| --- | --- | --- |
| 1 Phase 1 | None | Phase 1 |
| 2 Phase 2 | None | Phase 2 |
| 3 Phase 3 | 1 | Special Delay Phase |
| 4 Phase 4 | None | Phase 4 |
| 5 Phase 5 | 3 | Special Delay Phase |
| 6 Special Delay Phase | None | Special Delay Phase |

According to this example, all phases given a priority level of "1" would operate similarly to the above-described systems that do not include shared hierarchy communications protocols or prioritized phases. However, phases given a priority level of "2" could be interrupted by phases given a priority level of 1. Similarly, phases given a priority level of "3" could be interrupted by phases given a priority level of 1 or 2. Therefore, for example, if Welder B was in a Negative Peak Phase, it could be interrupted by Welder A if Welder A sends a subordination command. Similarly, Welder B could be interrupted by Welder C if Welder C sends a subordination command associated with entering Phase 3. For example, should Welder A send a subordination command while Welder B is in a Negative Peak Phase, Welder B transitions to the Negative Background Phase, thus, allowing Welder A to enter the Peak Phase.

However, Welder B could not be interrupted by Welder C if Welder C sends a subordination command associated with entering Phase 5. That is, since Phase 5 has a priority level of 3, it cannot interrupt Welder B when it is in a Negative Peak Phase because the Negative Peak Phase has a priority level of 2 and Phase 5 has a priority level of 3. As such, Welder C would have to go to the Special Delay Phase until Welder B removes the subordination command associated with the current Negative Peak Phase.

Referring again to FIG. 2, to coordinate the outputs of the first and second MIG welders, the MIG welders communicate subordination commands over the communications link 48. Therefore, the first and second MIG welders 50, 52 communicate in a peer-to-peer fashion to synchronize the cooperative MIG welding process. In particular, the first and second MIG welders 50, 52 transmit peak phase disable and clear peak phase disable commands to dynamically alternate between superior and subordinate states. When a welder is operating as a subordinate, it cannot enter the peak phase. On the other hand, when a welder is operating as a superior, it can enter the peak phase immediately and inhibit the adjacent welder from entering the peak phase.

As will be explained, by utilizing these dynamically generated subordination commands and/or superiority commands, the cooperative welding system 10 may include any number of individual MIG welders that may have varying operational parameters. Specifically, if additional MIG welders, such as the Nth MIG welder 54, are desired, the cooperative welding system 10 may be adapted to include the additional MIG welder. In this regard, to add another MIG welder, an additional communications link 65 is used to allow the added multi-welder communications module 66 and MIG welder controller 68 to communicate with adjacent MIG welders. Furthermore, as will be described, the welders may each have differing operational parameters such as differing wire feed speeds, phase or pulse frequencies, wire diameters, or wire types without altering or negatively affecting the cooperative pulsed MIG welding process.

As will be described in detail with respect to FIG. 4, when a given MIG welder, for example the second MIG welder 52, is prepared to enter a peak phase of a pulsed MIG process, the second MIG welder controller 62 communicates a peak phase disable signal via the second multi-welder communications module 58 and communications links 48, 65 to instruct the adjacent welders 50, 54 to operate as subordinates to the second MIG welder 52 until the peak phase disable is cleared.

In particular, after the second MIG welder 52 has completed the peak phase of the pulsed MIG welding process, the second MIG welder controller 62 communicates a clear peak phase disable signal via the second multi-welder communications module 58 and communications links 48, 65 to the adjacent welders 50, 54 to instruct the adjacent welders 50, 54 that they are no longer subordinate to the second MIG welder 52. Once the clear peak phase disable signal is received, the first MIG welder controller may then enter a peak phase of the pulsed MIG process. As such, the first MIG welder controller 60 communicates a peak phase disable signal via the first multi-welder communications module 56 and the communications link 48 to any adjacent welders, in this case the second MIG welder 52 that the welder is to operate as subordinate to the first MIG welder 50 until the peak phase disable is cleared. As such, the pulsed MIG welding processes of each individual MIG welder 50-54 is synchronized to perform a cooperative pulsed MIG welding process.

Alternatively, as previously stated, it is contemplated that a communications bus may be utilized to replace the individual communications links 48, 65. In this case, it is contemplated that the communications bus allows a given welder to communicate with all other welders connected to the communications bus substantially simultaneously. As such, any subordination command transmitted over the communications bus is received by all welders including adjacent and non-adjacent welders. To enable the welders to determine whether a particular subordination command was transmitted by an adjacent welder, a welder identification is included with the subordination command. As such, only welders adjacent to the welder transmitting the subordination command are inhibited from entering the peak phase. That is, when a subordination command is received each welder reviews the welder identification associated with the subordination command to determine whether it originated from an adjacent welder.

In this regard, when configuring the welders in the cooperative welding system by connected each welder to the communications bus, it is contemplated that welder identifications are selected. It is further contemplated that this selection process may be either manually or automatically performed. That is, when configuring the cooperative welding system, an operator may manually designate the position identification of each welder such that when a subordination command is received with accompanying welder identification, each welder can determine whether the command was sent by an adjunct welder.

Alternatively, it is contemplated that the welders may be configured to automatically determine welder position identifications within the cooperative welding system. This process may be achieved by various methods and protocols. For example, during setup, the welders may pass a key to each new welder added to the cooperative welding system whereby each welder increments the key and stores that value as the position identifier. In particular, the first welder attached to the communications bus is configured to search for additional welders connected to the communications bus. Upon finding no additional welders, the first welder assigns itself the first welder identification. When a second welder is added to the communications bus, the first welder passes the second welder the key which as been initialized by the first welder upon assigning itself an identification. The second welder increments the key and then assigns itself the second position identifier. Similarly, when a third welder is added to the communications bus, it receives the key, increments the key, and assigns itself the third position. Therefore, one of numerous automated protocols is achieved for self-assigning a position identifier.

Figure 4:
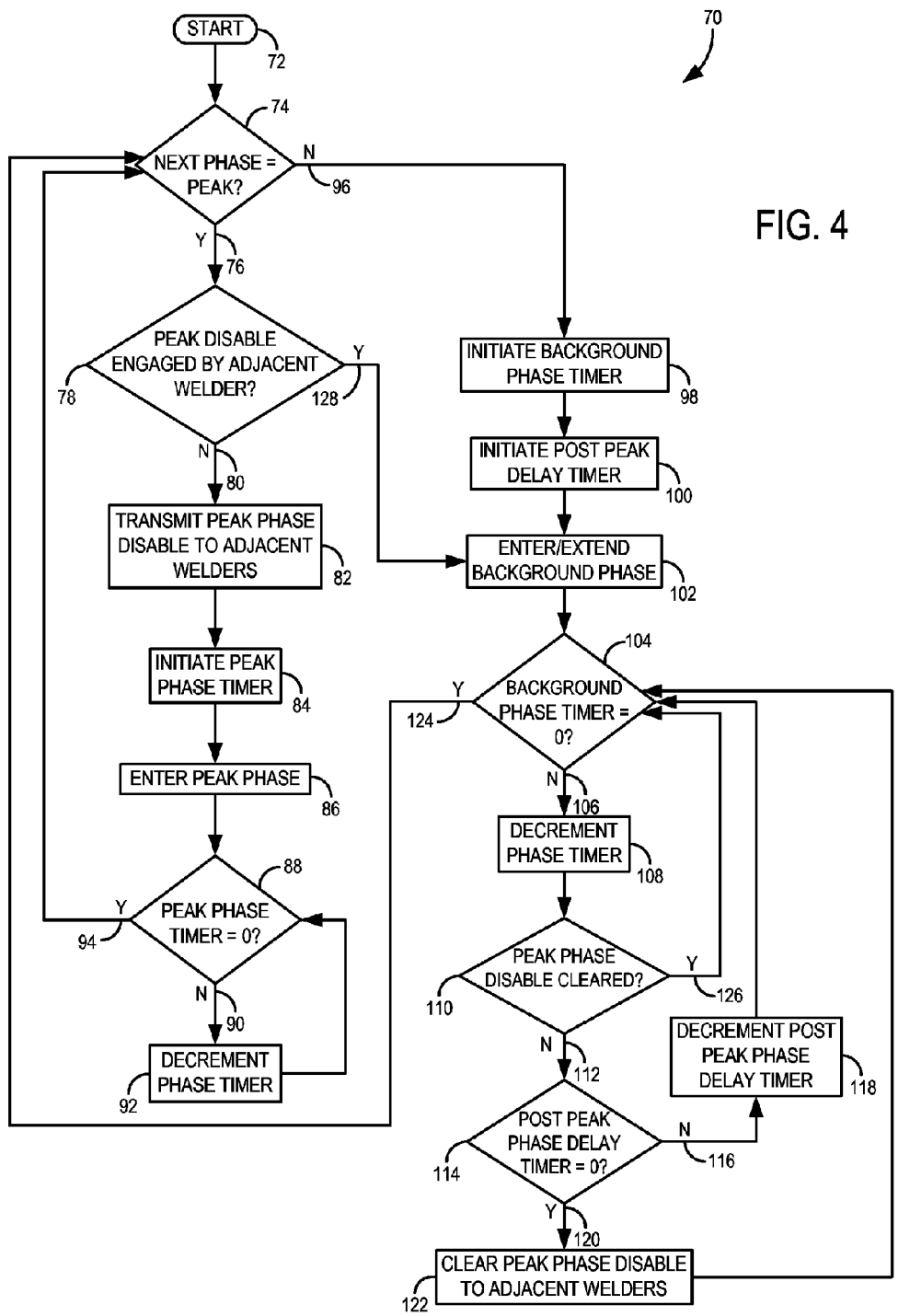
FIG. 4 is a flow chart setting forth the steps of a control technique for operating a cooperative welding system in accordance with the present invention.

Referring now to FIG. 4, a flow chart is shown setting forth the steps of a technique 70 performed by a given MIG welder to operate in the cooperative pulsed MIG welding process. The technique 70 starts 72 by determining whether the next phase in the pulsed MIG process is the "peak" or high current phase. If the next phase in the pulsed MIG welding process is the peak phase 76, the system determines whether a peak disable has been received from an adjacent welder 78. If no peak disable signal has been received by an adjacent welder 80, the welder can then transmit a peak phase disable signal to the adjacent welders 82. Substantially simultaneously upon transmitting a peak phase disable signal to the adjacent welders 82, the welder initiates a peak phase timer 84 that is used to determine the duration of the peak phase and the peak phase is entered 86. During the peak phase, the system iteratively checks whether the peak phase timer has expired 88, and if the peak phase timer has not expired 90, the peak phase timer is decremented 92.

Once the peak phase timer has expired 94 and, thus, the peak current should be reduced to the background current level, the system again checks to determine whether the next phase is peak 74. If the next phase is not peak 96, the system initiates a background phase timer 98 and post peak delay timer 100. As will be described in detail with respect to FIG. 5, the post peak delay timer is utilized to inject a delay between the transition of one welder into the background phase and the transition of an adjacent welder to the peak phase. As such, substantially simultaneously with the initiation of the background phase timer 98 and post peak delay timer 100, the system enters the background phase 102.

The technique 70 continues by checking whether the background phase timer has expired 104. If the timer has not expired 106, the background phase timer is decremented 108. The system then determines whether the peak disable signal that was previously transmitted 82, has been cleared 110. If the peak phase disable has not yet been cleared 112, then the adjacent welders are still delegated to be subordinate to the welder and cannot enter the peak phase until the peak phase disable has been cleared. Accordingly, the system determines whether the post peak phase timer has expired 114. If the desired delay between the welder entering the background phase and an adjacent welder entering the peak phase has not expired 116, then the post peak phase timer is decremented 118. On the other hand, if the desired delay has expired 120, then a signal is sent to adjacent welders to clear the peak phase disable 122, thus, removing the subordination delegation.

It is contemplated that under some multi-welder applications, an operator may not desire any delay between a given welder entering the background phase and an adjacent welder being permitted to enter the peak phase. In this case, the post peak phase delay may be initialized 100 to zero. As such, during the initial check 114, the post peak phase delay will have expired 120 and the clear peak phase disable 122 is immediately sent to the adjacent welders. Alternatively, if no post peak phase delay is desired, it is contemplated that the technique may be modified to send the clear peak phase disable signal to the adjacent welders 122 immediately upon entering the background phase 102.

Regardless of whether the post peak phase delay timer is initially set to zero or been assigned a desired value 100, the post peak phase delay will be set to expire prior to the background phase timer expiring 124. Therefore, the clear peak phase disable will be sent to adjacent welders 122 prior to the background phase timer expiring 124. Accordingly, the system will eventually find that the peak phase disable has been cleared 126 and will continue to check whether the background phase timer has expired 104, decrement the background phase timer 108, and check whether the peak phase disable has cleared 110.

Once the post peak phase delay has expired 120 and the signal is sent to adjacent welders to clear the peak phase disable 122, the welder may receive a peak disable signal from an adjacent welder. That is, once the clear peak phase disable has been sent, the adjacent welders are no longer currently designated to be subordinate and are free to send a peak disable signal to designate adjacent welders as subordinates. In this case, when the background phase is complete 124 and the welder is prepared to enter the peak phase 74, 76, the peak phase disable will have been engaged by an adjacent welder 78, 128. As such, though the welder would be ready to enter the peak phase, the background phase is extended or "stretched" 102 by adding time to the background phase timer. This loop continues until the adjacent welder removes the peak disable 80.

The above-described technique 70 allows two or more MIG welders to perform a cooperative pulsed MIG welding process where adjacent welders are not in the peak phase concurrently. That is, the communications links connecting the two or more MIG welders allows each welder to deliver subordination commands to adjacent MIG welders to preclude adjacent MIG welders from entering the peak phase until the subordination command is removed. Referring now to FIG. 5, exemplary output waveforms generated by a three-welder cooperative MIG welding system operating according to the above-described technique are shown. As illustrated, adjacent welders are not in a peak phase 63 concurrently. That is, the outputs of the first and third welders may concurrently be at a peak phase while the second welder is at a background phase. Similarly, neither the first nor third welders leave the background phase 64 while the second welder is in a peak phase 63. Additionally, as illustrated, a peak phase delay 129 may be included to preclude any welder from entering the peak phase for a user-selected or preset duration after an adjacent welder leaves the peak phase.

As such, a cooperative welding system is created that is capable of performing a multi-welder MIG welding process based on a dynamically controlled pulse welding procedure to accommodate varying welding parameters between the multiple MIG welders. Furthermore, the multi-welder MIG welding system can include more than two independent MIG welders. Moreover, the cooperative MIG welding system is configured to operate autonomously and independently when removed from the cooperative welding system.

Therefore, the present invention includes, a welding system having at least two metal inert gas (MIG) welders configured to perform a cooperative pulsed MIG welding process. The welding system also includes at least one communications link connecting the at least two MIG welders to deliver at least one of subordination commands and superiority commands to either of the at least two MIG welders to synchronize the cooperative pulsed MIG welding process.

Therefore, the present invention also includes a MIG welder having a power source configured to provide power according to a pulsed MIG welding process. The MIG welding system also includes a controller configured to control operation of an another MIG welder during a first phase of the pulsed MIG welding process and to be controlled by the another MIG welder during a second phase of the pulsed MIG welding process.

In another embodiment of the present invention, a welding system includes an array of MIG welding power sources configured to operate according to a reciprocal pulsed MIG welding process. Each MIG welding power source is configured to communicate a standby command to an adjacent welding power source when each welding power source is entering a peak phase of the reciprocal pulsed MIG welding process to preclude any adjacent welding power source from concurrently entering the peak phase of the reciprocal pulsed MIG welding process.

The present invention has been described in terms of the preferred embodiment, and it is recognized that equivalents, alternatives, and modifications, aside from those expressly stated, are possible and within the scope of the appending claims.

What is claimed is:

1. A welding system comprising:
   a first welding device comprising a first controller configured to control operation of the first welding device;
   a second welding device comprising a second controller configured to control operation of the second welding device; and
   at least one communications link communicatively connecting the first and second controllers;
   wherein the first and second welding devices cooperatively perform a cooperative welding process, wherein the first controller is configured to deliver a subordination command and a superiority command to the second controller and the second controller is configured to deliver a subordination command and a superiority command to the first controller to synchronize the cooperative welding process; and
   wherein each of the first and second controllers are configured to dynamically generate the subordination command and the superiority command.

2. The welding system of claim 1, wherein each of the first and second controllers is configured to function as a superior controller and a subordinate controller, such that:
   when the first controller is functioning as the superior controller and the second controller is functioning as the subordinate controller, the first controller is configured to transmit a first subordination command to the second controller when the first welding device enters a high current phase of the cooperative welding process, and to clear the first subordination command only after completion of the high current phase; and
   when the second controller is functioning as the superior controller and the first controller is functioning as the subordinate controller, the second controller is configured to transmit a second subordination command to the first controller when the second welding device enters the high current phase of the cooperative welding process, and to clear the second subordination command only after completion of the high current phase.

3. The welding system of claim 2, wherein, when the first controller is functioning as the subordinate controller, the first controller is configured to delay the first welding device from entering the high current phase of the cooperative welding process upon receiving the second subordination command until the second subordination command is cleared, and when the second controller is functioning as the subordinate controller, the second controller is configured to delay the second welding device from entering the high current phase of the cooperative welding process upon receiving the first subordination command until the first subordination command is cleared.

4. The welding system of claim 3, wherein the superior controller is configured to clear the first subordination command after a delay period following completion of the high current phase.

5. The welding system of claim 3, wherein the subordinate controller is configured to transmit the second subordination command to the superior controller after the first subordination command is cleared.

6. The welding system of claim 1, wherein the first and second controllers are configured to operate autonomously and independently when the at least one communications link is removed.

7. The welding system of claim 1, wherein the cooperative welding process is a cooperative pulsed metal inert gas (MIG) welding process.

8. A metal inert gas (MIG) welder comprising:
   a power source configured to provide power according to a MIG welding process; and
   a controller configured to control operation of a second MIG welder during a first phase of the MIG welding process, and to be controlled by the second MIG welder during a second phase of the MIG welding process;
   wherein the MIG welder and the second MIG welder are controlled to dynamically alternate pulses of the MIG welding process.

9. The MIG welder of claim 8, wherein during the first phase the controller is configured to cause the power source to deliver power according to a high current phase of the MIG welding process, and during the second phase the controller is configured to cause the power source to deliver power according to a background phase of the MIG welding process.

10. The MIG welder of claim 8, comprising a welding torch configured to operate in a tandem welding system.

11. The MIG welder of claim 8, wherein the MIG welding process includes at least one of a two phase pulsed MIG process, a direct current (DC) MIG process, an alternating current (AC) MIG process, and a short-by-short process.

12. The MIG welder of claim 8, wherein the MIG welder and the second MIG welder are configured to communicate according to a shared hierarchy communications protocol.

13. The MIG welder of claim 8, wherein the first phase and the second phase have respective phase priorities.

14. The MIG welder of claim 8, wherein the second phase is a delay phase.

15. A method comprising:
cooperatively performing a cooperative metal inert gas (MIG) welding process using first and second welding devices having respective first and second controllers and connected via a communications link; and
synchronizing the cooperative MIG welding process by delivering at least one of a subordination command and a superiority command from the first controller to the second controller;
wherein synchronizing the cooperative MIG welding process comprises transmitting a first subordination command from the first controller to the second controller when the first welding device enters a high current phase of the cooperative MIG welding process, and clearing the first subordination command after completion of the high current phase.

16. The method of claim 15, wherein synchronizing the cooperative MIG welding process comprises the second controller delaying the second welding device from entering a high current phase of the cooperative MIG welding process upon receiving the first subordination command until the first subordination command is cleared.

17. The method of claim 16, wherein synchronizing the cooperative MIG welding process comprises the first controller clearing the first subordination command after a delay period following completion of the high current phase.

18. The method of claim 16, wherein synchronizing the cooperative MIG welding process comprises the second controller transmitting a second subordination command to the first controller after the first subordination command is cleared and the second welding device enters the high current phase of the cooperative MIG welding process to delay the first welding device from initiating the high current phase.

* * * * *